United States Patent
Ricks et al.

(10) Patent No.: US 9,213,100 B1
(45) Date of Patent: Dec. 15, 2015

(54) BEARING-ONLY TRACKING FOR HORIZONTAL LINEAR ARRAYS WITH RAPID, ACCURATE INITIATION AND A ROBUST TRACK ACCURACY THRESHOLD

(71) Applicant: The United States of America as represented by the Secretary of the Navy, Washington, DC (US)

(72) Inventors: Rockie L. Ricks, San Diego, CA (US); Cherry Y. Wakayama, Poway, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 463 days.

(21) Appl. No.: 13/898,366

(22) Filed: May 20, 2013

(51) Int. Cl.
   *G01S 15/00* (2006.01)
   *G01S 15/66* (2006.01)

(52) U.S. Cl.
   CPC .................... *G01S 15/66* (2013.01)

(58) Field of Classification Search
   CPC ....... G01S 11/14; G01S 15/66; G01S 3/8083; G01S 3/8086; G01S 5/20
   USPC .......................................................... 367/99
   See application file for complete search history.

(56) References Cited

U.S. PATENT DOCUMENTS

| | | | | |
|---|---|---|---|---|
| 5,732,043 A | * | 3/1998 | Nguyen | G01S 3/8083 367/120 |
| 2002/0097635 A1 | * | 7/2002 | LaRosa | G01S 15/66 367/130 |
| 2011/0103190 A1 | * | 5/2011 | Steiner | G01S 3/8083 367/118 |
| 2015/0268329 A1 | * | 9/2015 | Yannone | G01S 5/0252 342/13 |

* cited by examiner

*Primary Examiner* — Mark Hellner
(74) *Attorney, Agent, or Firm* — SPAWAR Systems Center Pacific; Kyle Eppele; J. Eric Anderson

(57) ABSTRACT

A method forms a passive acoustic track to cue an active multistatic acoustic tracking system. The passive track cue reduces the false track rate in the active tracker by focusing search area and selectively initiating active tracks. The passive track originates from a fixed passive acoustic horizontal line array (HLA). The HLA cannot determine target range or resolve left-right ambiguity but can predict Closest-Point-of-Approach (CPA) events. For each CPA event, a cue is forwarded to the active system for initiation. The method presents a minimal parametric representation for a passive acoustic track and uses an algorithm to obtain initial estimated parameters to initiate the passive track more effectively. A performance evaluation is given. The method also includes conversion of the passive track to normalized-coordinates for use with multistatic tracking systems. The passive track quality is assessed to determine whether it is sufficient to justify cueing the active multistatic system.

11 Claims, 10 Drawing Sheets

BEARING-ONLY TRACKING FOR HORIZONTAL LINEAR ARRAYS WITH RAPID, ACCURATE INITIATION AND A ROBUST TRACK ACCURACY THRESHOLD

FEDERALLY-SPONSORED RESEARCH AND DEVELOPMENT

This invention is owned by the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Please reference Navy Case No. 102285.

BACKGROUND

Active acoustic systems can be overwhelmed by false alarms due to reverberation and environmental features. The false alarms are particularly problematic during a search mode where target location is completely unknown. In a multi-static system, detections from each ping are monitored on multiple receivers and most of these are false alarms; actual target echoes may or may not be present. The multiplicity of false alarms leads to the formation of false target tracks that must be sorted out over time.

It is therefore desirable to have information that permits focusing on a target search region to reduce false alarms and enables more rapid winnowing of false target tracks. In addition, it is desirable to conserve the energy required for a full active search by choosing active sources in a favorable position relative to tracks originated from passive acoustic systems.

SUMMARY

The joint cooperative use of passive and active sonar offers synergistic and complimentary acoustic performance as well as operational advantages. The challenge of heterogeneous, multi-sensor systems is the successful fusion of information from the various sensors to enable robust target detection, classification, localization, and tracking. The method described herein is the formation of passive acoustic tracks by a passive acoustic system. The passive acoustic tracks may be used to cue an active multistatic acoustic tracking system. Using a passive acoustic track as a cue reduces the false track rate in the active tracker by focusing the search area and selectively initiating active tracks. As described, the passive track originates from a fixed passive acoustic horizontal line array (HLA). The HLA is unable to determine target range or resolve the familiar left-right ambiguity but can predict Closest-Point-of-Approach (CPA) events for constant velocity target tracks. For each CPA event, a cue can be forwarded to the active system for multistatic active track initiation. The method presented herein uses a minimal parametric representation for a passive acoustic track. The method describes an algorithm for obtaining initial estimates of parameters that can be used to initiate an optimization routine which estimates the track parameters more accurately. A performance evaluation is given. The method also describes the conversion of the passive track parameters to a target position trajectory in normalized-coordinates. Normalized-coordinates are used because of the inability of a passive system to estimate target range. The use of normalized coordinates provides estimates similar to target position which is convenient for use with a multistatic tracking system. Passive track quality is assessed to determine if it is sufficient to justify cueing the active multistatic system.

DETAILED DESCRIPTION

The method described herein is an initialization of a passive track originated from a fixed passive acoustic horizontal line array and the formulation of a passive track cue. Usage of a passive track as a cue with its corresponding range ambiguity presents a challenge for active tracking. However as described in Section I herein, a passive track does provide estimates of the parameters contained in a minimal parametric representation which includes time of the Closest-Point-of-Approach (CPA), target heading, and the ratio of speed to CPA distance as parameters. The passive track also provides normalized target position estimates based on these parameters. Section I of this description defines the passive track parameters. Section II of this description describes a method of obtaining coarse initial estimates of passive track parameters. The coarse initial parameter estimates are used to initiate an optimization routine of the passive tracker. A derivation of the coarse initial parameter estimates is described in Section III.

In Section IV an initialization algorithm is evaluated with regard to the performance of the optimization routine. In preparation for sending a cue, normalized positions and velocities are calculated from the passive track parameters. These along with their covariance matrices are passed as a cue to a multistatic active tracking system as described in Section V. Finally, in Section VI, a measure of passive cue quality is given. The quality measure is based on the estimated accuracy of target position in normalized coordinates.

I. Minimal Parametric Representation of Passive Track

Figure 1:
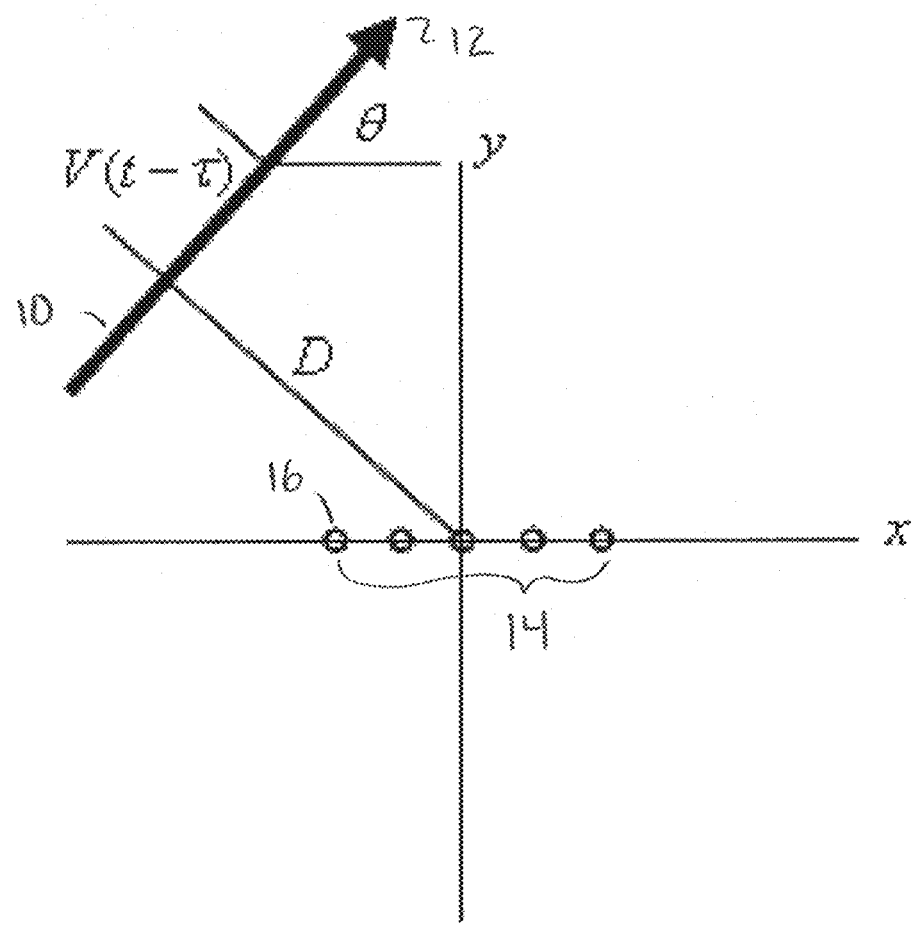
FIG. 1 illustrates parameters that define constant velocity target trajectory according to a representative example herein.

Referring to FIG. 1, before an estimation of target track parameters is made, a trajectory 10 of a target 12 is first uniquely represented by a minimum number of well-defined parameters and the relationship between the target trajectory and associated target measurements is clearly defined. As shown in the figure, a linear array 14 of signal sensors 16 is used to receive signals from target 12. The sensors 16 provide measurements of the signals they receive and these measurements allow the derivation of target cone bearing and other target motion parameters. The equations for cone bearing as a function of time and target motion parameters are described below.

A minimum parametric representation of target 12 on trajectory 10 is shown in FIG. 1 for a target on a constant velocity trajectory with parameters, CPA distance: $D\epsilon(-\infty\infty)$; target speed: $V\epsilon[0\ \infty)$; target heading: $\theta\epsilon[-\pi\pi)$, and time of CPA: $\tau\epsilon(-\infty\infty)$. With these parameters the cosine of the cone angle, $C(t)$, can be expressed as $$C(t) = \frac{\text{sign}(V/D)\sin\theta + |V/D|(t-\tau)\cos\theta}{\sqrt{1+(h/D)^2+(V/D)^2(t-\tau)^2}} \qquad (1)$$

where h is the depth difference between the target and sensor. Depth h is not shown in the two-dimensional representation of FIG. 1. Some simplification can be made using $$\alpha^2 = 1 + (h/D)^2 \qquad (2)$$

$$v = V/D \qquad (3)$$

and $$s = \text{sign}(V/D) \qquad (4)$$

without loss of generality to yield $$C(t) = \frac{s\sin\theta + |v|(t-\tau)\cos\theta}{\sqrt{\alpha^2 + v^2(t-\tau)^2}}. \qquad (5)$$

In (5) target speed and CPA distance do not appear individually, but only in the ratio v. The minimal representation of a passive track uses time of the (CPA): $\tau\epsilon(-\infty\infty)$, target heading: $\theta\epsilon(-\pi\pi]$, and the speed over CPA distance: $v\epsilon(-\infty\infty)$, as parameters.

There is also an inherent ambiguity, often called the left-right ambiguity, in representing a target trajectory by a set of cone bearing measurements. Briefly, for any given target trajectory, there is another trajectory that is symmetric about the axis of the sensor line array that yields exactly the same cone bearing measurements. If the parameter set $(\tau,v,\theta)$ produces a given bearing trajectory, then the parameter set $(\tau_a, v_a, \theta_a)$ producing the ambiguous trajectory is given by $$\tau_a = \tau$$

$$v_a = -v$$

$$\theta_a = 360 - \theta. \qquad (6)$$

To uniquely define the parameter set associated with a given bearing trajectory, the restriction v>0 is added. Then (5) can be written as $$C(t) = \frac{\sin\theta + v(t-\tau)\cos\theta}{\sqrt{\alpha^2 + v^2(t-\tau)^2}}. \qquad (7)$$

From this relationship, a system of equations is extracted that can be solved to yield an initial estimate of the target track parameters.

II. Passive Track Initialization

A multi-dimensional optimization routine may be used for estimating track parameters by minimizing the square error between the measurements and estimates of the measurements based on the track parameters, in a least squares sense (to be described in Section III). The performance of the optimization in terms of convergence is greatly improved by a good initial track parameter estimate. An algorithm is developed for providing that initial track parameter estimate. Effort has been made to avoid abstraction and give physical meaning to provide the understanding necessary to establish reasonable bounds and limits.

To derive an initial estimate of track parameters, one multiplies (7) by the right side denominator and squares both sides of the resulting equation. Simplification can be achieved by introducing the notation $\gamma = \gamma(t) = v \cdot (t-\tau)$ i.e. time that is centered at the time of CPA and scaled, and $C=C(t)$ to yield $$(\alpha^2+\gamma^2)C^2 = \sin^2\theta + \gamma^2\cos^2\theta + 2\gamma\sin\theta\cos\theta \qquad (8)$$

which can be put into the quadratic form $$\gamma^2(C^2-\cos^2\theta) - 2\gamma\sin\theta\cos\theta + \alpha^2C^2 - \sin^2\theta = 0. \qquad (9)$$

Equation (9) is solved for $\gamma$ to yield the two solutions $$\gamma = \frac{\sin\theta\cos\theta \pm |C|\sqrt{\sin^2\theta - \alpha^2(C^2 - \cos^2\theta)}}{C^2 - \cos^2\theta} \qquad (10)$$

Solutions must be checked numerically because squaring can introduce erroneous solutions. Also, the square root in (10) is imaginary if its argument is negative, indicating that no solution exists.

Figure 2:
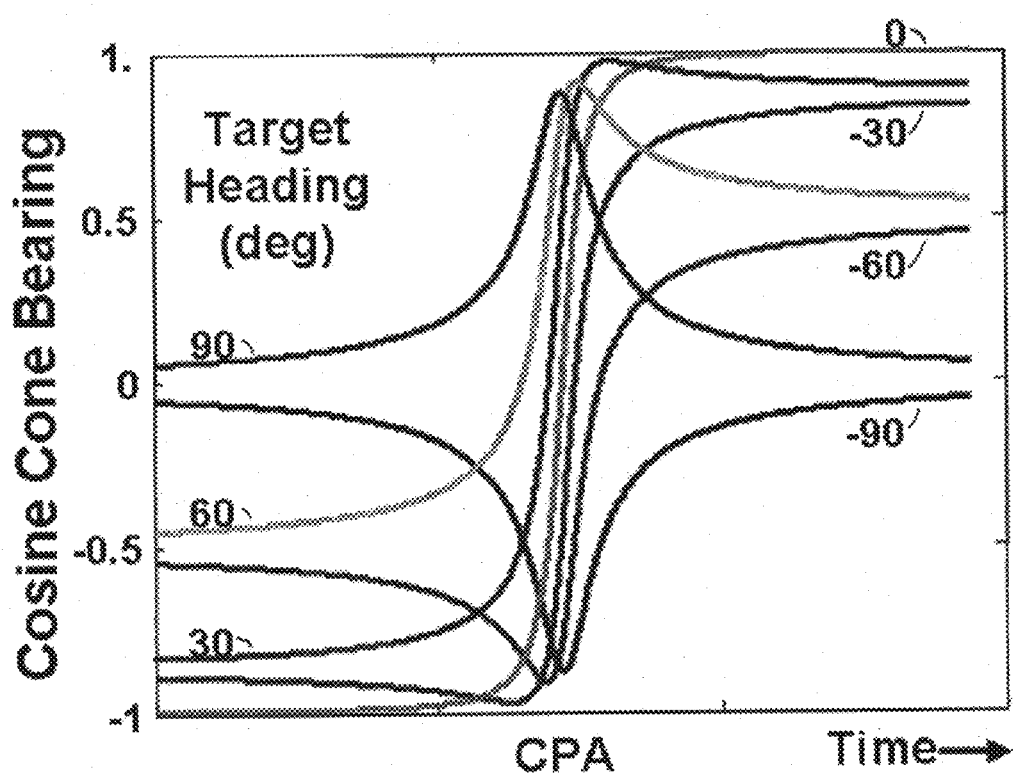
FIG. 2 shows curves of the cosine of the cone bearing for several values of target heading.

FIG. 2 shows that there may be 0, 1, or 2 solutions to (7). Consider the case for a target heading of 90 degrees. If $C(t)$, the cosine of cone bearing, is less than 0, no solution exists because the curve never takes on those values. If $C(t)$ is between 0 and some maximum value of the curve, there are two solutions to (7) because the curve takes on the measurement value for two values of time. If $C(t)$ is equal to the maximum value of the curve, there is one unique solution. If $C(t)$ is greater than the maximum value of the curve, again, no solution exists. Similar analysis applies for other target headings.

Let the two solutions to (10) be referenced as $\gamma_1(t)$ and $\gamma_2(t)$ corresponding to the + and − signs, respectively. For a given value of $\theta$, v and $\tau$ can be calculated from $\gamma$ at two different time samples, $t_i$ and $t_j$, using $$\tau_{m,n} = \frac{\gamma_m(t_j)t_i - \gamma_n(t_i)t_j}{\gamma_m(t_j) - \gamma_n(t_i)} \qquad (11)$$

$$v_{m,n} = \frac{\gamma_m(t_j) - \gamma_n(t_i)}{t_j - t_i}$$

yielding four solution with indices m=1, 2 and n=1, 2.

Care must be taken in choosing i and j. In the explanation that follows, an approach for choosing i and j is developed starting with a simple concept and adding sophistication as required. The process is illustrated in detail in FIG. 3.

The curves in FIG. 2 show that if i is chosen too early, estimates of γ may be overly sensitive to noise due to fluctuations and the initial flatness of the curves. Hence, i is chosen to follow a significant change in C(t). The measurement noise standard deviation, $\sigma_C$, is assumed either known a priori, or measured. Then i is chosen such that the change in the measurements exceeds a threshold of $k_i$ noise standard deviations. Mathematically, i is the smallest index such that $$|C(t_i)-C(t_1)| \geq k_i \sigma_C \qquad (12)$$

where $k_i$ is a parameter and $t_1$ is the time or "epoch" of the first measurement sample.

Similarly, the difference, $\gamma_m(t_j)-\gamma_n(t_i)$, in the denominator of (11) indicates a sensitivity of CPA time estimates to small changes in γ. Hence j is also chosen such that the change in the measurements exceeds a threshold of $k_j$ noise standard deviations. Mathematically, j is the smallest index such that $$|C(t_j)-C(t_i)| \geq k_j \sigma_C. \qquad (13)$$

This method of choosing i and j is intuitive, but lacks robustness to measurement noise. Because i and j are chosen using fixed thresholds, the measurements selected thereby tend to be outliers. To mitigate the outlier tendency, the measurement following the $2^{nd}$ threshold exceedance is used instead of the $1^{st}$ threshold exceedance.

Another noise concern is that i and j are chosen using criteria that depend on single measurements which are highly susceptible to noise. That susceptibility may be mitigated by replacing the single measurement by an average of $n_{ave}$ measurements, where $n_{ave}$ is a user-defined positive integer. To avoid including the threshold exceedance in the average, the i measurement is replaced by an average of i through $i+n_{ave}-1$ measurements. Similarly, the j measurement is replaced by an average of j through $j+n_{ave}-1$ measurements.

As a matter of practicality, if the chosen measurement or average of measurements is outside the interval, [−1 1], a subsequent sample or average is chosen since there are no solutions to (10) for any heading.

Figure 3:
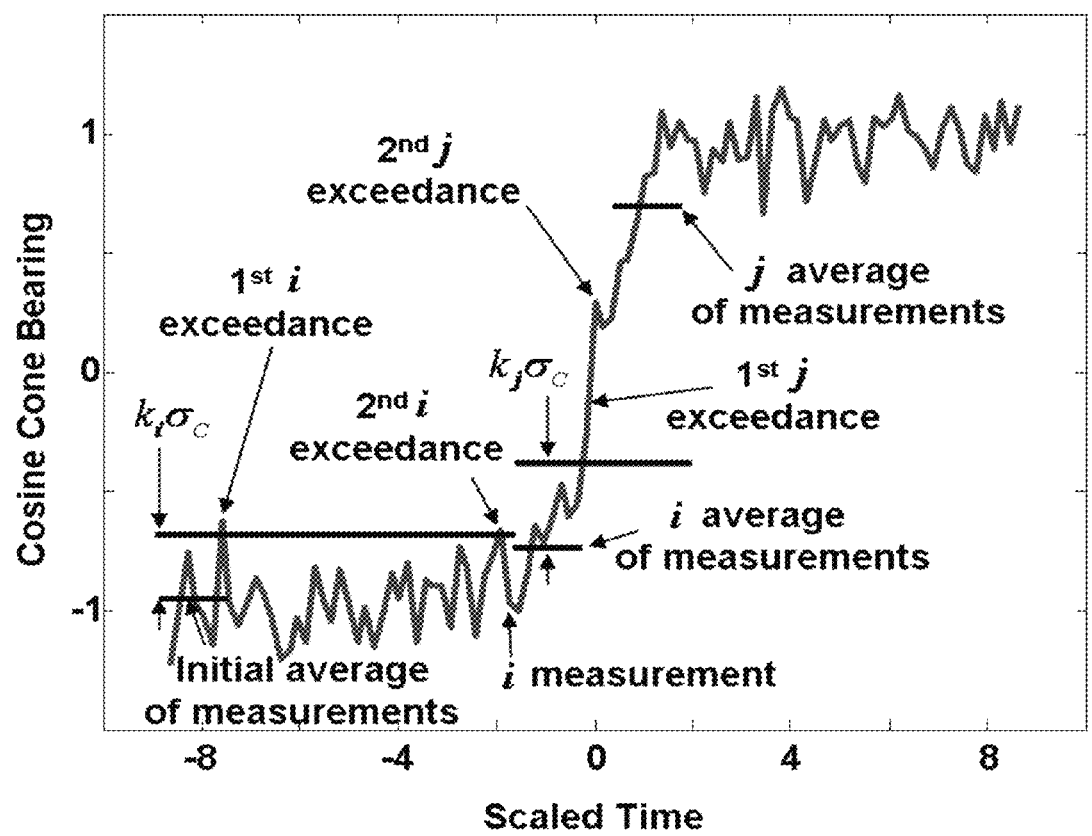
FIG. 3 illustrates how i and j are chosen and the corresponding measurement averages as per the example given herein.

The process for choosing i and j is illustrated in detail in FIG. 3. For choosing i, the first (initial) average of measurements, which replaces $C(t_1)$, is shown. The $1^{st}$ and $2^{nd}$ exceedance of the i threshold, $k_i \sigma_c$ are shown along with the i measurement as the measurement following the $2^{nd}$ i threshold exceedance. The average of the i through $i+n_{ave}-1$ measurements is labeled as the i average of measurements.

For choosing j, the $1^{st}$ and $2^{nd}$ exceedance of the j threshold, $k_j \sigma_C$, are shown along with the j measurement which is the measurement following the $2^{nd}$ j threshold exceedance. The average of j through $j+n_{ave}-1$ measurement is labeled as the j average of measurements.

The calculations in (10) and (11) assume the target heading is known. Four sets of parameter estimates may be found for each hypothesized heading. To obtain the initial parameter estimate, heading is sampled with a user-defined sample size, $n_\theta$, to obtain the sample set $\{\theta_u\}_{u=1}^{n_\theta}$, and a score is defined and maximized over the $4 \times n_\theta$ space of parameter estimate sets. Elements of the space are indexed by l. The score of each element is the least squares fit between the measurements, $C(t_k)$, and estimated measurements, $\hat{C}(\bar{p}_l,t)$, based on the parameter estimate set, $\bar{p}_l$. Mathematically, the score of the l'th parameter estimate set, $S_l$, is defined as $$S_l = \Sigma_{k=1}^{K}(C(t_k)-\hat{C}(\bar{p}_l,t_k))^2 \, l=1,\ldots,4n_\theta \qquad (14)$$

The parameter estimate set with the highest score becomes the initialization parameter set. The initialization parameter estimates are expected to improve as the number of time samples or epochs, K, increases because more measurements are used in calculating the score. However, the parameter estimate sets do not change as K increases.

III. Full Optimization

After initial estimates of the passive track parameters are calculated, a full nonlinear optimization is conducted. In the full optimization all three track parameters are estimated simultaneously. Thus, the initialization uses what is effectively a 1-D parameter search in θ space whereas the full optimization employs a full 3-D search in (τ,ν,θ) space. The full optimization minimizes the same score as used in the initialization, which is given in (14). This optimization employs, for example, the Nelder-Meade downhill simplex algorithm. The score is only mildly sensitive to the additional parameter, α. Expanding the search to four dimensions by optimizing over α does not appear warranted, but further evaluation can be conducted.

IV. Evaluation of Passive Track Initialization

The parameter calculation used to initialize the optimization can be placed through a performance evaluation to justify its use. The purpose of the initialization is to improve convergence rates for the full optimization. Therefore, convergence is a useful performance measure. Another performance measure is the amount of data required before passive track initialization can be attained. There is an expectation that passive track initiation and cue generation will occur well before the CPA event.

A Monte Carlo simulation, for example, was used to test the performance of the initialization algorithm. In the simulation, the target had a speed of 4.3 meters per second and the CPA distance was 500 meters. Target headings were sampled from 0 to 90 degrees in 10 degree increments. Because of symmetries with respect to the passive array, this range of headings covers all cases. This simulation was used only for evaluating the initialization. A more complete simulation known as PacSim (a simulator for passive and multistatic active contacts), for example, can be used for testing the performance of the active tracker with passive cues as described in Section VI.

Figure 4:
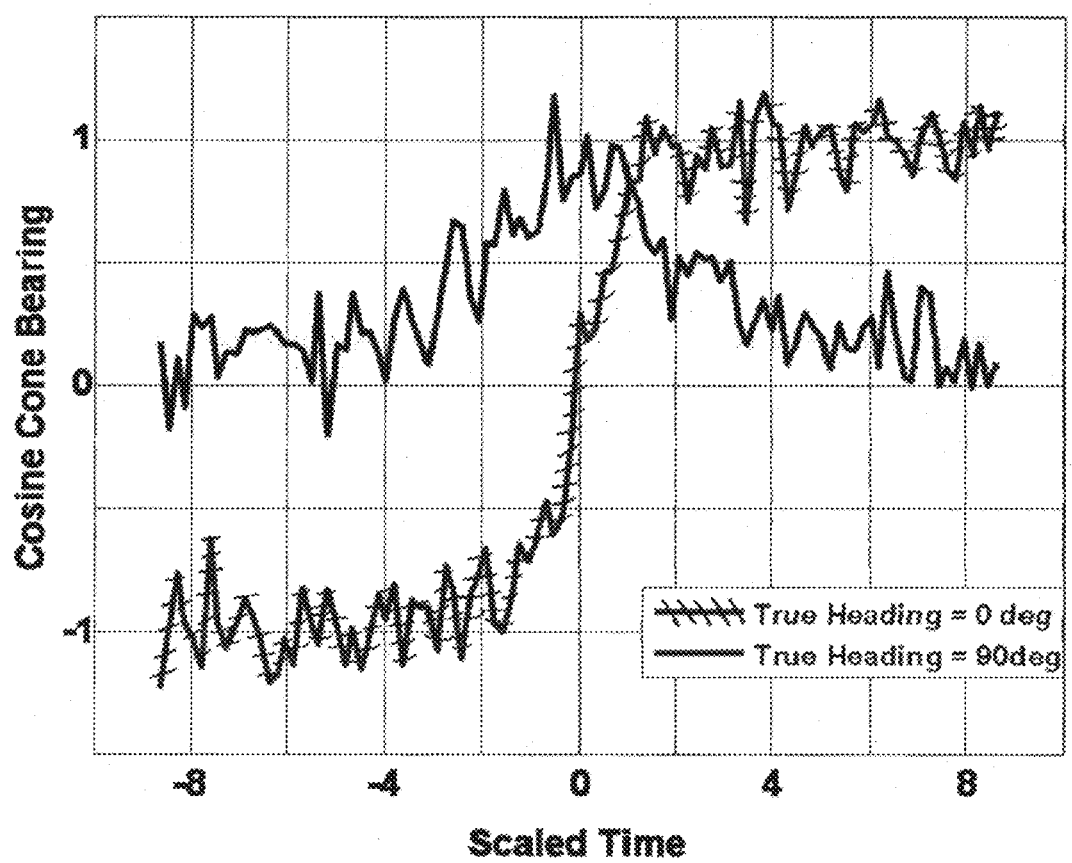
FIG. 4 depicts cosine of cone bearing with noise for the representative example described herein for two target headings.

True values of cosine cone bearing measurements were calculated and Gaussian noise with a standard deviation of 0.12 was added. Adding noise to cosine cone bearing measurements gives a better representation of horizontal line array performance than adding noise directly to the cone bearing measurements. It matches the reality that there is greater bearing uncertainty for a target at endfire with respect to the array and greater bearing accuracy at broadside with respect to the array. A measurement standard deviation of 0.12 for cosine cone bearings corresponds to a cone bearing standard deviation of 10 degrees at a cone bearing of 45 degrees. For simplicity, cosine cone bearing measurements outside of the [−1 1] interval were allowed. The one exception is that subsequent measurements were chosen when calculating i and j if the chosen measurements or average of measurements is outside that interval. An example of noisy simulated cosine cone bearing measurements is shown in FIG. 4 for target headings of 0 degrees (along array axis) and 90 degrees (cross array axis). For the evaluation, parameters values were $k_i=1.8$, $k_j=2.0$, $n_{ave}=7$ and $n_\theta=36$. The evaluation simulation used 3,000 Monte Carlo iterations. For each iteration, a noise realization is added to the true measurements. Then the initialization time, i.e. the time that the initialization criterion is met, was calculated. Then, the optimization was performed twice, one time using the initialization algorithm and a second time using a poor initialization, $\tau_{init}, v_{init}, \theta_{init})$ defined as $$\tau_{init} = \tau - 435$$

$$v_{init} = 0.2$$

$$\theta_{init} \sim U(-180 \ 180] \tag{15}$$

where U(-180 180] is a random uniform distribution on the interval -180 to 180 degrees and values of $\theta_{init}$ are samples from that distribution.

Figure 5:
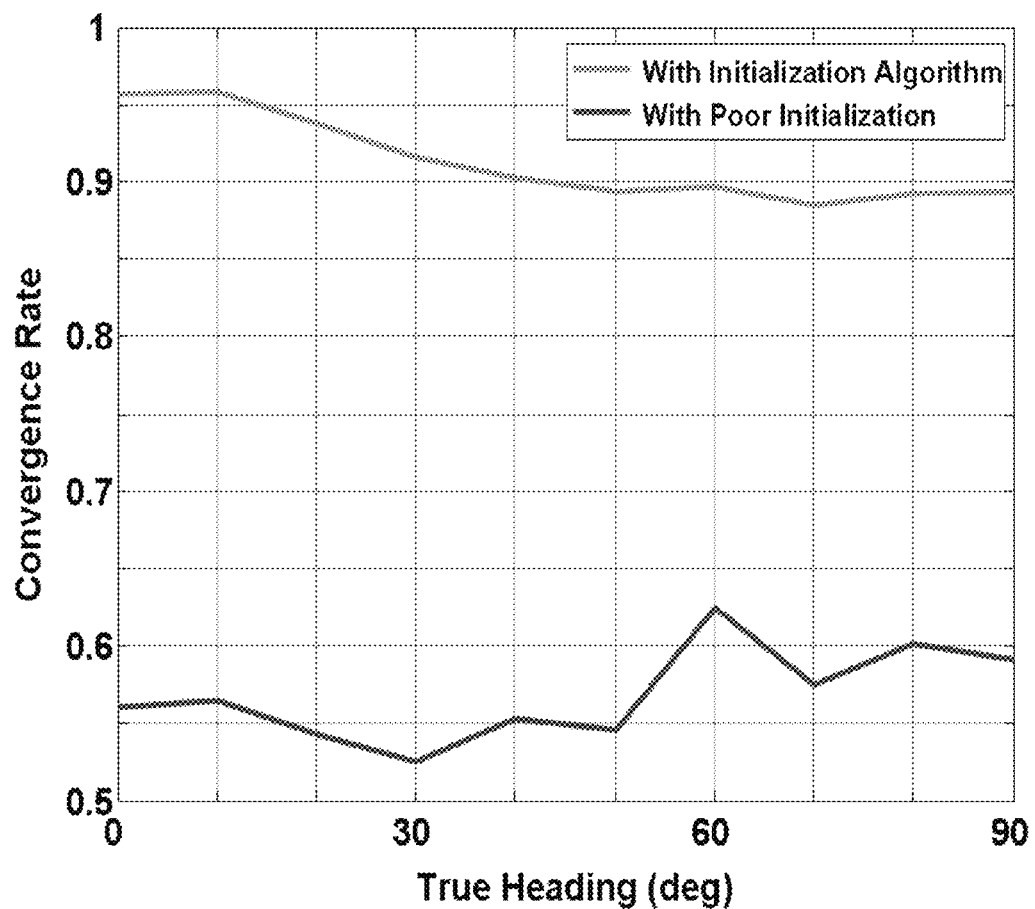
FIG. 5 is an example of a graphical description of optimization convergence rates with the initialization algorithm described herein versus poor initialization.
Figure 6:
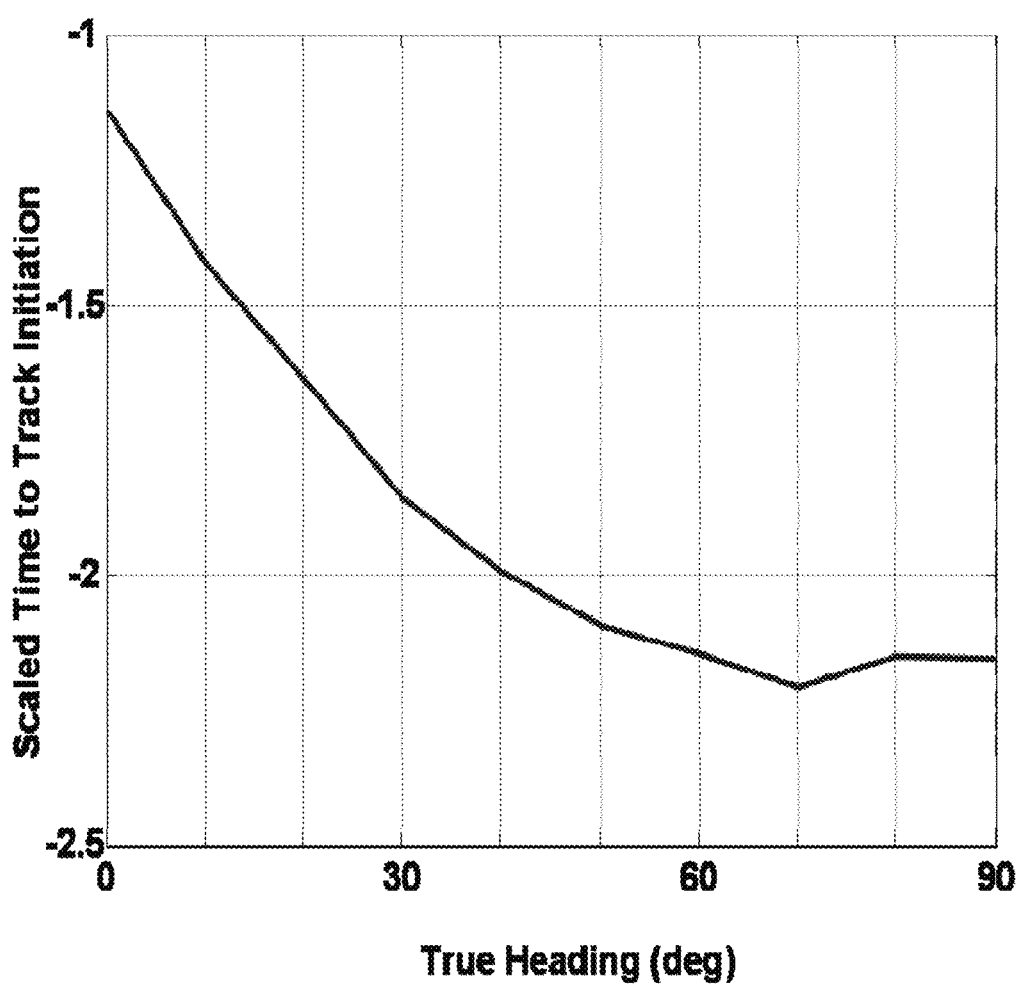
FIG. 6 shows track initialization time versus target heading. The time is scaled by the true target speed to CPA distance ratio.

For both initialization cases, the optimization used only those measurements with times prior to the initialization time. Performance is given in terms of average initialization times and average convergence rates. Convergence is defined as meeting a tolerance level of 1.e-4 in 600 optimization steps. The comparison of convergence rates is shown in FIG. 5. Clearly, the intelligent initialization scheme improves convergence for all values of heading. Average initialization times are shown in FIG. 6. Time is shown as scaled time (i.e. $\gamma = v \cdot (t-\tau)$) which is dimensionless. A time value of 0 represents the time of CPA.

On average, initialization occurs well before CPA for all headings. Note that track initiation occurs earlier for target trajectories cross ways of the array axis and the corresponding convergence rate degrade slightly as would be expected from the use of fewer measurements.

V. Conversion to Normalized Parameters

The passive track parameters must be converted from the 3-dimensional (3-D) $(\tau,\theta,v)$ space to 4-D Cartesian space (x, y, $\dot{x}$, $\dot{y}$) to initiate a track in the active tracker, where $\dot{x}$ and $\dot{y}$ represent target velocity components in the x and y directions. In the active tracker, a CPA distance will be introduced into the passive track space as an unknown parameter. A convenient method of representing the passive track is in normalized-coordinates, i.e. the target state vector $x=[x,y,\dot{x},\dot{y}]^T$ Normalized by the CPA Distance D. Mathematically, the normalized-coordinate state, $\overline{X}=[\bar{x},\bar{y},\bar{\dot{x}},\bar{\dot{y}}]^T$ can be expressed as $$\bar{x}(t) = \frac{x}{D} = -\sin\theta + v(t-\tau)\cos\theta \tag{14}$$

$$\bar{y}(t) = \frac{y}{D} = \cos\theta + v(t-\tau)\sin\theta$$

$$\bar{\dot{x}}(t) = \frac{\dot{x}}{D} = v\cos\theta$$

$$\bar{\dot{y}}(t) = \frac{\dot{y}}{D} = v\sin\theta.$$

The normalized-coordinate solution is given in array centered coordinates. The equally valid ambiguous solution is also passed to the active tracker. In practice, the ambiguity may be resolved if the sensor array deviates sufficiently from a straight array, but the general case is addressed here. The ambiguous state vector, $\overline{X}_a = [\tilde{x}_a, \tilde{y}_a, \tilde{\dot{x}}_a, \tilde{\dot{y}}_a]^T$, can be derived from (6). However, in that case, D is negative. In the active tracker, it is convenient to consider D as positive. Therefore, a sign change is applied to the normalized state to yield $$\bar{x}_a(t) = \bar{x}(t) = -\sin\theta + v(t-\tau)\cos\theta \tag{15}$$

$$\bar{y}_a(t) = \bar{y}(t) = -\cos\theta - v(t-\tau)\sin\theta$$

$$\bar{\dot{x}}_a(t) = \bar{\dot{x}}(t) = v\cos\theta$$

$$\bar{\dot{y}}_a(t) = \bar{\dot{y}}(t) = -v\sin\theta.$$

Covariance matrices for both the target and ambiguous state vectors are calculated in Monte Carlo fashion and passed to the active tracker. Again the noise standard deviation is assumed either known or measured. To generate each Monte Carlo sample, a realization of measurement noise is added to the cosine cone bearing measurements. Then, optimization is used to estimate the passive track parameters. Next, the normalized-coordinate target and ambiguous state vectors are calculated from the passive track parameters. The covariance matrices are calculated from the Monte Carlo samples of target and ambiguous state vectors. Although a bias is introduced by the nonlinearity of the equations, the original state estimates were used as means rather than the sample mean. Calculation of the covariance matrices need not be computationally intensive. The optimization converges quickly if initiated with the original parameter estimate. Reasonable estimates can be obtained with 30 Monte Carlo samples (i.e. 30 iterations).

VI. Passive Track Quality

Measurements arrive sequentially from the passive sensor. With the arrival of each measurement, an attempt is made to initiate a passive track. If the passive track was initiated, the quality of the passive track parameter estimate is evaluated. If the track quality which will be defined below meets or exceeds a cueing criterion derived from user-defined thresholds, a passive cue is sent to initiate the active tracker in the multistatic active tracking system. Track parameter estimation begins when the passive track is initiated and continues until the track quality meets the cueing criterion. The value of continuing to update the passive track after sending the cue is being evaluated further. One measure of track quality is the area of the target positional uncertainty ellipse. The ellipse is in normalized-coordinates rather than the real Cartesian coordinates, but can be thought of as a scaled position vector. Consideration was given to using the uncertainty ellipsoid associated with the full covariance matrix. However, the 4-D covariance matrix, $\Sigma$, is generated from three passive track parameters. If the relationship between the passive track parameters and the normalized coordinates was linear, the covariance matrix would have reduced rank. Therefore, only the 2×2 $\tilde{x}$-$\tilde{y}$ sub-matrix, $\Sigma_{xy}$, of the covariance matrix is used and the normalized-coordinate positional area of uncertainty is calculated. Let the 2×2 $\tilde{x}$-$\tilde{y}$ sub-matrix of the covariance be $$\sum_{xy} = \begin{bmatrix} \sigma_{\tilde{x}\tilde{x}} & \sigma_{\tilde{x}\tilde{y}} \\ \sigma_{\tilde{x}\tilde{y}} & \sigma_{\tilde{y}\tilde{y}} \end{bmatrix}. \tag{16}$$

The uncertainty ellipse is formed from points of equal probability and is given by $$c = \frac{\sigma_{\tilde{y}\tilde{y}}}{d}\tilde{x}^2 - \frac{2\sigma_{\tilde{x}\tilde{y}}}{d}\tilde{x}\tilde{y} + \frac{\sigma_{\tilde{x}\tilde{x}}}{d}\tilde{y}^2 \tag{17}$$

-continued $$d = \sigma_{\tilde{x}\tilde{x}}\sigma_{\tilde{y}\tilde{y}} - \sigma_{\tilde{x}\tilde{y}}^2.$$

The probability, p, that the true position is within the ellipse is given as $$p=1-e^{-c/2} \quad (18)$$

and the area of the ellipse, A, is $$A=c\pi\sqrt{d} \quad (21)$$

Solving (18) for c and substituting into (21) yields $$A=(-2\ln(1-p))\pi\sqrt{d} \quad (22)$$

which depends on the covariance matrix through d. The calculated area of uncertainty is then smoothed over time using a moving average filter to obtain a quality measure that is more robust to parameter estimation errors. The implementation of the moving average filter is given in the following equation (23):

$$\overline{A}[i] = \frac{1}{L}\sum_{j=0}^{L-1} A[i+j], \quad (23)$$

where A[i] and $\overline{A}[i]$ represent the area of uncertainty and the smoothed area of uncertainty at time index i, respectively, and L is the number of points used in the moving average. The time difference, i.e. the difference between two consecutive values of the smoothed area of uncertainty is also calculated. The cueing criterion is met when the smoothed area of uncertainty value is less than the user-defined threshold (Threshold 1) and the absolute value of the time difference of the smoothed area of uncertainty is less than the user-defined difference threshold (Threshold 2). The area of uncertainty, the smoothed area of uncertainty and the time difference of the smoothed areas of uncertainty are calculated from the time of passive track initiation until the cueing criterion is met and a cue is sent to the active tracker. Though not a complete performance measure, the results of the area of uncertainty, the smoothed area and the time difference of the smoothed areas quality measures are given for a single simulated run. The simulated run was generated using the PacSim simulator program described in Grimmett, D., C. Wakayama, and R. Ricks, "Simulation of Passive and Multistatic Active Sonar Contacts," Proc. Of the 4th Intl. Conf. On Underwater Acoustic Measurements: Technologies and Results, Kos, Greece, June 2011.

Figure 7:
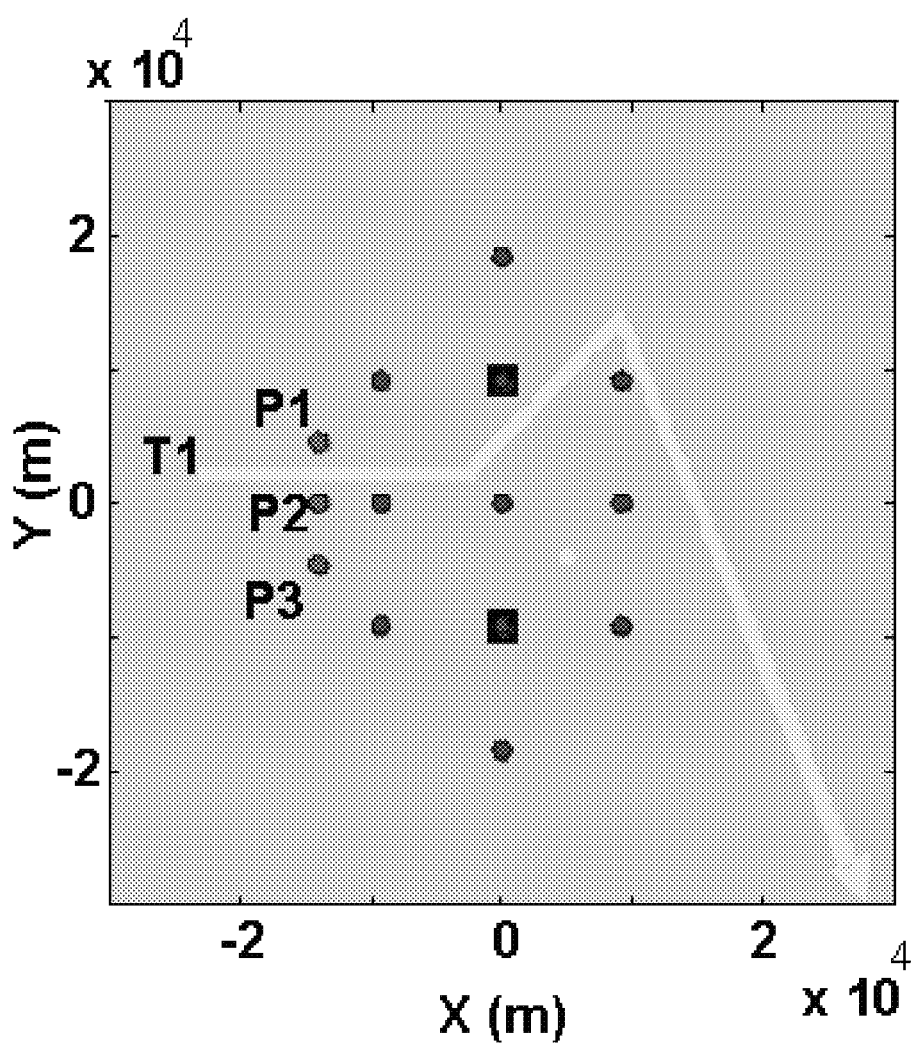
FIG. 7 shows the scenario used to simulate data for performance evaluation.

From the target sensor geometry shown in FIG. 7, the run scenario uses the first leg of target T1 and receiver array P1. In this scenario, the axis of the sensor array is oriented parallel to the target trajectory.

Figure 8:
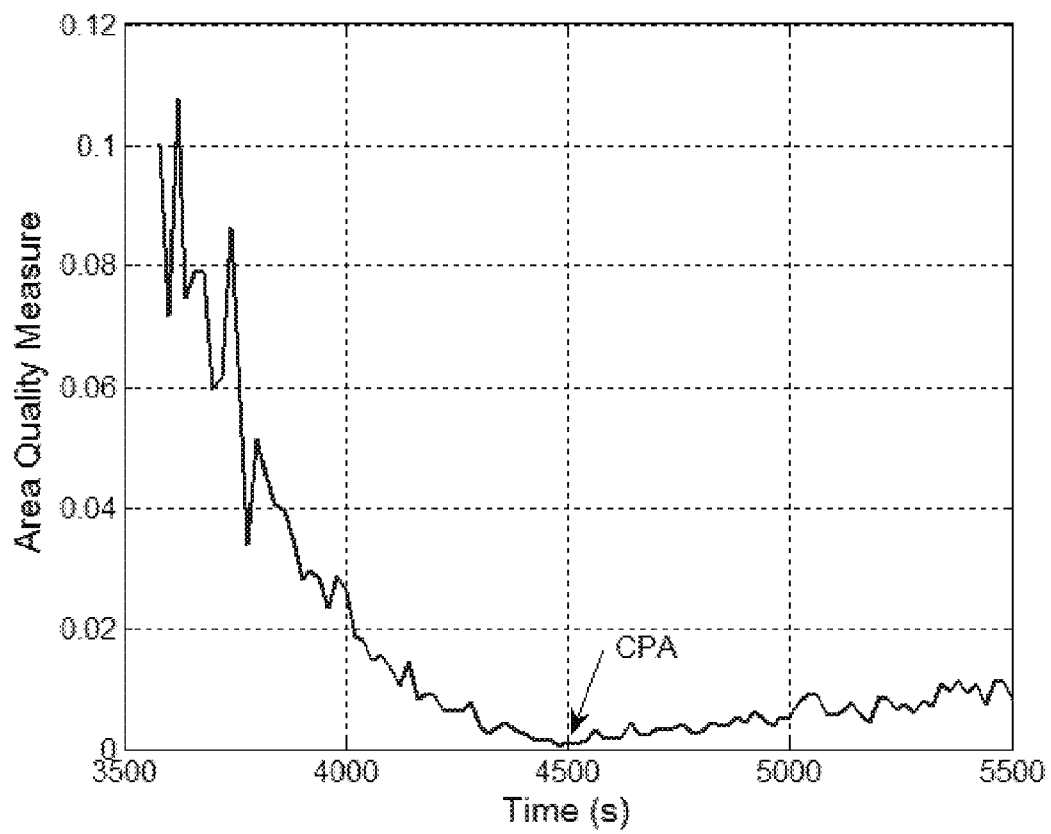
FIG. 8 depicts the area of uncertainty quality measurement for a simulated scenario as per the exemplary description herein. The area of uncertainty pertains to target position in normalized coordinates.
Figure 9:
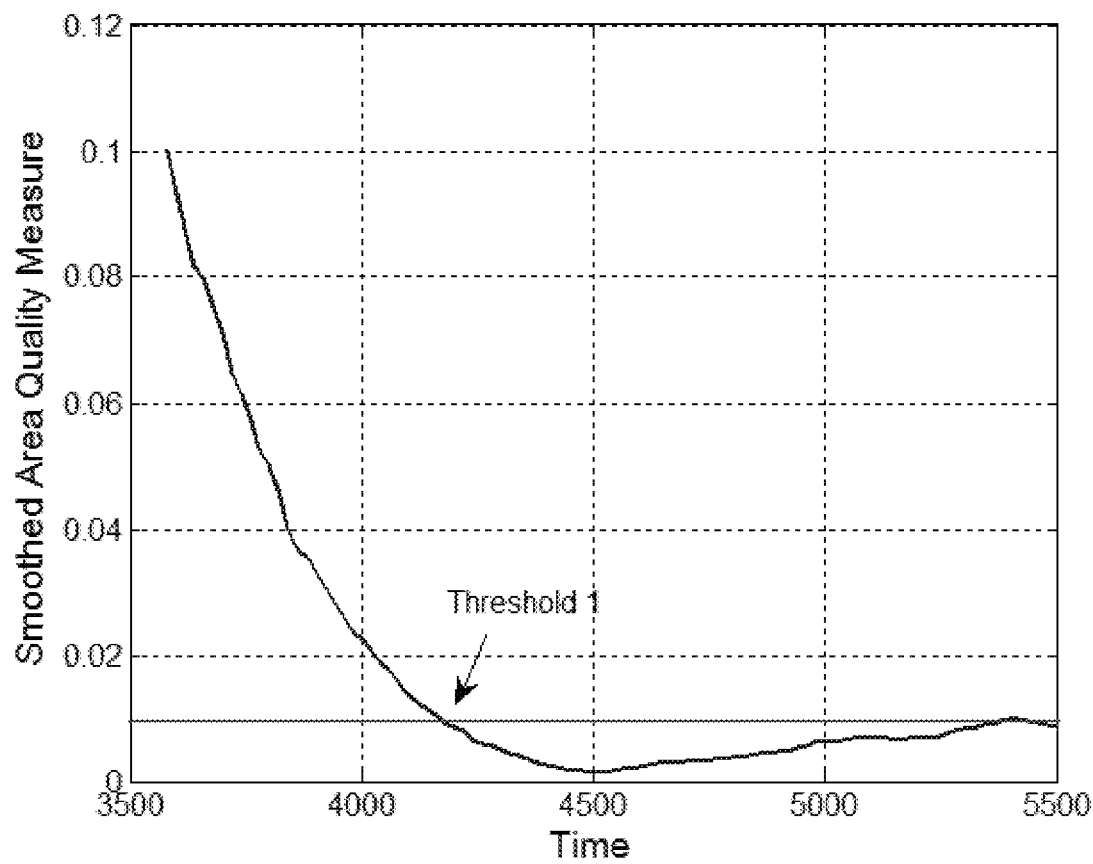
FIG. 9 depicts a smoothed area of uncertainty quality measurement for a simulated scenario as per the exemplary description herein.
Figure 10:
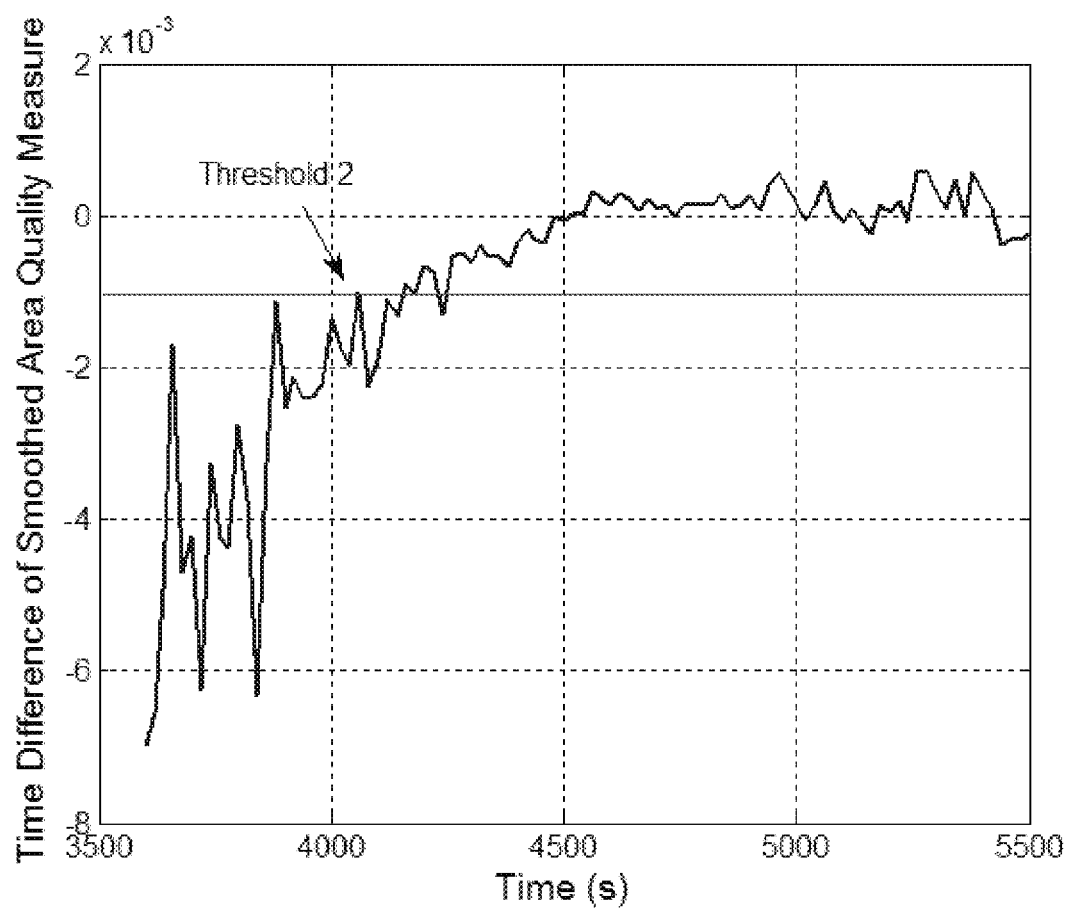
FIG. 10 depicts a time-difference of smoothed area of uncertainty quality measurement for a simulated scenario as per the exemplary description herein.

The target is shown initially moving eastward at 2.6 m/s (5 knots). It first passes passive receivers P at time 4500 seconds with a CPA distance of 2200 meters. The area, the smoothed area and the time-difference of smoothed area quality measures for this run are shown in FIG. 8, FIG. 9, and FIG. 10 respectively. Note that the area quality measure for the passive track reduces to a minimum near CPA as expected. FIG. 8 also shows that the track quality degrades slowly after CPA leaving a broad segment of time in which a good cue can be reported. From FIG. 9 and FIG. 10, it is observed that the smoothed area quality measure passes Threshold 1 and the time-difference of smoothed area quality measure passes Threshold 2 at time 4150 seconds. Thus, the cueing criterion is met and a cue is sent to the active tracker.

VII. Conclusions

A method of using a passive track from a horizontal line array to initiate a multistatic active tracking system is described. A minimal parameteric representation for passive tracks is presented along with an algorithm for obtaining coarse estimates of the parameters. An improvement in convergence with the initialization algorithm is shown along with the estimation time as a function of target heading. A normalized-coordinate representation of the passive track is given along with a method of calculating the covariance matrix of the normalized-coordinate track representation. Finally, a measure of track quality is presented that corresponds to the normalized-coordinate track representation. The algorithm and approach provide an effective way to use passive tracks to cue multistatic active systems or perform fusion with other sensors in a Cartesian space.

Obviously, many modifications and variations are possible in light of the above description. It is therefore to be understood that within the scope of the claims the invention may be practiced otherwise than as has been specifically described.

What is claimed is:

1. A signal processing method for providing passive target tracking information as cues to initiate active target tracking comprising the steps of:
    taking target bearing measurements over predetermined time intervals hereafter called epochs, wherein the step of taking a target bearing measurement includes
        receiving target signals upon a linear array of signal sensors;
        measuring the received target signals to generate measured target signals;
        deriving a single target bearing measurement from the target signals measured during a single said epoch;
    taking the target bearing measurements for a plurality of epochs to generate at least three target bearing measurements;
    calculating initial target track parameters using the at least three target bearing measurements;
    using nonlinear optimization to calculate optimized target track parameters using the calculated initial target track parameters as a starting point for the optimization;
    estimating target positions and target velocities in normalized coordinates from the optimized target track parameters;
    determining a normalized area of uncertainty value for each estimated target position;
    smoothing the normalized area of uncertainty values to arrive at smoothed area of uncertainty values;
    determining if the optimized target track parameters meet passive cueing criterion by comparing each of the smoothed area of uncertainty values to a user-defined threshold 1 and comparing the absolute value of the difference between two of the smoothed area of uncertainty values to a user-defined threshold 2; and
    providing the estimated target positions and target velocities to initiate an active target tracker when the smoothed area of uncertainty value is less than the threshold 1 and the absolute value of the time difference between two consecutive values of the smoothed area of uncertainty is less than the user-defined threshold 2.

2. The method of claim 1 wherein the step of calculating initial target track parameters includes calculating:
    target speed over closest-point-of-approach distance;
    time of closest-point-of-approach; and
    target heading.

3. The method of claim 1 wherein the single target bearing measurement is defined as the cosine of a target cone bearing measurement.

4. The method of claim 1 wherein the step of using nonlinear optimization includes using Nelder-Meade Nonlinear Optimization.

5. A signal processing method for providing passive target tracking information as cues to initiate active target tracking comprising the steps of:
   taking target bearing measurements of a target over predetermined time intervals hereafter called epochs, wherein the step of taking a target bearing measurement includes
      receiving target signals upon a linear array of signal sensors;
      measuring the received target signals to generate measured target signals;
      deriving a single target bearing measurement from the target signals measured during a single said epoch;
   averaging the target bearing measurements for a plurality of epochs to generate at least two average target bearing measurements;
   calculating initial target track parameters using the at least two average target bearing measurements and at least one of the single target bearing measurements taken in the steps above, wherein the step of calculating initial target track parameters includes calculating
      target speed over closest-point-of-approach distance;
      time of closest-point-of-approach; and
      target heading;
   using nonlinear optimization to calculate optimized target track parameters using the calculated initial target track parameters as a starting point for the optimization;
   estimating target positions and target velocities in normalized coordinates from the optimized target track parameters;
   determining a normalized area of uncertainty value for each estimated target position;
   smoothing the normalized area of uncertainty values to arrive at smoothed area of uncertainty values;
   determining if the optimized target track parameters meet passive cueing criterion by comparing the smoothed area of uncertainty values to a user-defined threshold 1 and comparing the absolute value of the difference between two consecutive smoothed area of uncertainty values to a user-defined threshold 2; and
   providing the estimated target positions and target velocities to initiate an active target tracker when the smoothed area of uncertainty value is less than the threshold 1 and the absolute value of the time difference between two consecutive values of the smoothed area of uncertainty is less than the user-defined threshold 2.

6. The method of claim 5 wherein the single target bearing measurement is defined as the cosine of a target cone bearing measurement.

7. The method of claim 5 wherein the step of using nonlinear optimization includes using Nelder-Meade Nonlinear Optimization.

8. A signal processing method for providing passive target tracking information as cues to initiate active target tracking comprising the steps of:
   taking target bearing measurements over a first set of predetermined time intervals hereafter called epochs, wherein the step of taking a target bearing measurement includes
      receiving target signals upon a linear array of signal sensors;
      measuring the received target signals to generate measured target signals;
      deriving a single target bearing measurement from the target signals measured during a single said epoch;
   averaging the target bearing measurements for the first set of epochs to generate a first average target bearing measurement;
   setting a first target bearing threshold that is an offset from the first average target bearing measurement;
   taking target bearing measurements for additional epochs until a taken target bearing measurement exceeds the first bearing threshold a second time;
   taking target bearing measurements over a second set of epochs;
   averaging the target bearing measurements for the second set of epochs to generate a second average target bearing measurement referred to herein as Ci;
   setting a second target bearing threshold as an offset from the second average target bearing measurement wherein the second average target bearing threshold is different than the first average target bearing threshold;
   taking target bearing measurements for additional epochs until a taken target bearing measurement exceeds the second bearing threshold a second time;
   taking target bearing measurements over a third set of epochs;
   averaging the bearing measurements from the third set of epochs to generate a third average target bearing measurement referred to herein as Cj;
   calculating initial target track parameters using Ci, Cj, and at least one of the single target bearing measurements taken in the steps above;
   using nonlinear optimization to calculate optimized target track parameters using the calculated initial target track parameters as a starting point for the optimization;
   estimating target positions and target velocities in normalized coordinates from the optimized target track parameters;
   determining a normalized area of uncertainty value for each estimated target position;
   smoothing the normalized area of uncertainty values to arrive at smoothed area of uncertainty values;
   determining if the optimized target track parameters meet passive cueing criterion by comparing the smoothed area of uncertainty values to a user-defined threshold 1 and comparing the absolute value of the difference between two said smoothed area of uncertainty values to a user-defined threshold 2; and
   providing the estimated target positions and target velocities to initiate an active target tracker when the smoothed area of uncertainty value is less than the threshold 1 and the absolute value of the time difference between two consecutive values of the smoothed area of uncertainty is less than the user-defined threshold 2.

9. The method of claim 8 wherein the step of calculating initial target track parameters includes calculating:
   target speed over closest-point-of-approach distance;
   time of closest-point-of-approach; and
   target heading.

10. The method of claim 9 wherein the single target bearing measurement is defined as the cosine of a target cone bearing measurement.

11. The method of claim 9 wherein the step of using nonlinear optimization includes using Nelder-Meade Nonlinear Optimization.

* * * * *